3,814,797
AQUEOUS LUBRICATING COMPOSITIONS AND
PROCESS FOR THE PREPARATION THEREOF
Fumio Kasahara, Chiba-ken, and Kazuo Takeshita, Fujisawa, Japan, assignors to Kimitsu Chemical Laboratory Co., Ltd., and Showa Yakuhinkako Kabushiki Kaisha, both of Tokyo, Japan
Filed June 15, 1972, Ser. No. 263,321
Claims priority, application Japan, June 24, 1971,
46/45,874
Int. Cl. A61k 27/00
U.S. Cl. 424—128                                 5 Claims

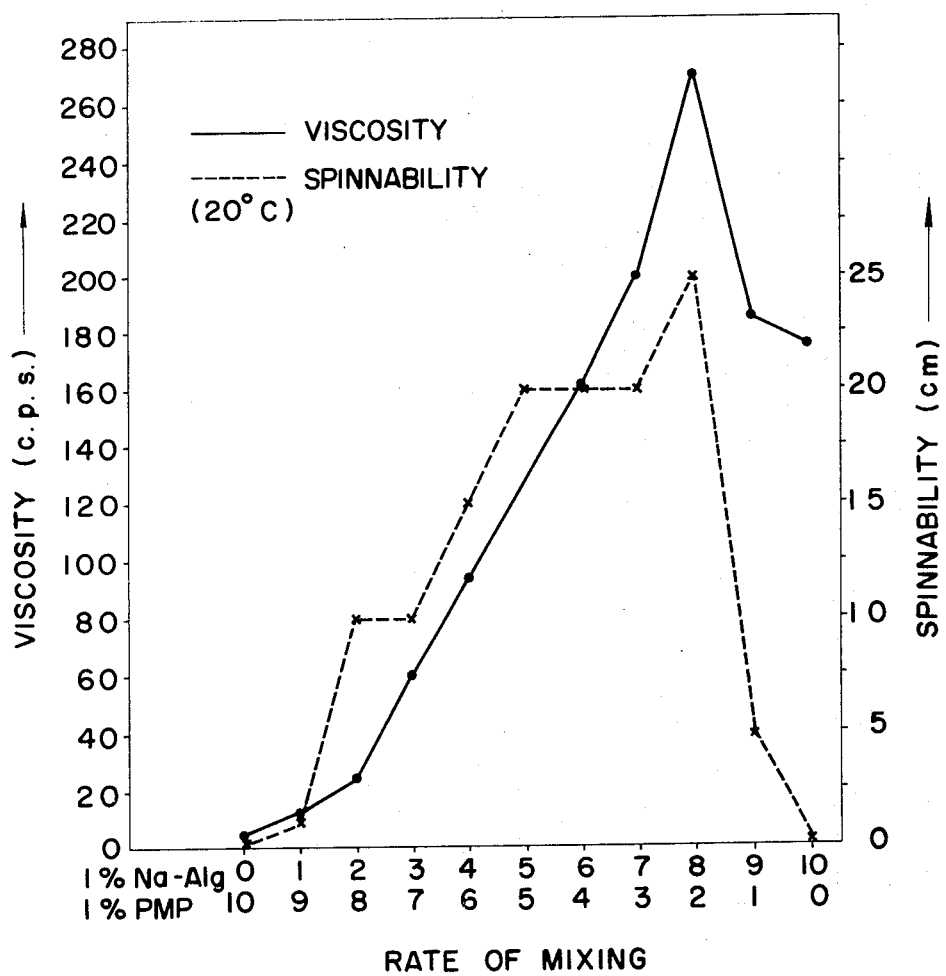

ABSTRACT OF THE DISCLOSURE

The present invention relates to aqueous lubricating compositions for imparting lubricity to the parts of living bodies comprising:

(A) potassium polymetaphosphate,
(B) a member of the group consisting of alginic acid, carboxymethyl cellulose, carboxymethyl starch and salts and mixtures thereof, and
(C) a member of the group consisting of sodium salts of weak acids and mixtures thereof, and a process for the preparation thereof.

BACKGROUND OF THE INVENTION

1. Field of the invention

The present invention relates to aqueous lubricating compositions for imparting lubricity to the parts of living bodies of human beings and other animals and a process for preparing aqueous lubricants from the compositions.

2. Description of prior art

A fetus of an animal such as a cow is wrapped double by amnion and chorion. Amniotic fluid is surrounded by the amnion and choroid-urine is surrounded by the chorion. In the delivery, "amnionic sac" including the fetus is forced out by uterine contraction. The chorion is first ruptured to discharge choroid-urine (first rupture of bag) and then the amnion is ruptured to discharge amniotic fluid (second rupture of bag). The amniotic fluid is a specific high molecular solution of a high viscosity and spinnability having fluidity like egg-white. This fluid covering the fetus imparts lubricity to the parturient canal to facilitate the expulsion.

In normal delivery, the amniotic fluid is sufficient in quantity but in a prolonged delivery, the amniotic fluid becomes insufficient and makes the expulsion more difficult. Moreover, high breeding techniques have developed recently to cause increase in physical build or lack in exercise have caused unfavorable results such as injuries of the parturient canal and fetal lesions in many cases.

The present invention provides lubricating compositions to be used in place of amniotic fluid.

The inventors have found previously that a liquid is necessary between the two frictional surfaces, i.e. mucous membrane of parturient canal and skin of the fetus for obtaining lubricity and that a substance of a high spinnability such as fucoidin or polyethylene oxide is suitable for this purpose. However, such a substance of high spinnability is generally macromolecular and, therefore, it is difficult to escape from the small opening between the two frictional surfaces.

The inventors have found later that the lubricating effect on parturient canal can be improved by using together with said compounds a viscous substance such as an alkali alginate or sodium carboxymethyl cellulose (hereinafter referred to as CMC-Na). The reasons are assumed to be that the viscous substances form a thicker liquid film together with the substance of high spinnability than that obtained from the latter substance alone and that the film does not escape easily from the canal.

After intensive investigations of a method of imparting higher spinnability to the viscous compounds such as alkali alginates and CMC-Na, the inventors have attained the present invention.

SUMMARY OF THE INVENTION

The present invention relates to aqueous lubricating compositions for imparting lubricity to the parts of living bodies and also a process for the preparation thereof.

After investigations, the inventors have found that a composition comprising:

(A) potassium polymetaphosphate (hereinafter referred to as PMP),
(B) a member of the group consisting of alginic acid, carboxymethyl cellulose, carboxymethyl starch and salts and mixtures thereof, and
(C) a member of the group consisting of sodium salts of weak acids and mixtures thereof forms viscous substance of a high spinnability when mixed with water and that the product thus obtained can be used for imparting lubricity to the parts of living bodies of human beings and other animals.

The invention will be described below in detail.

PMP used in the present invention are polymers represented by the general formula: $(KPO_3)_n$ which are generally called "K-Kurol salts." The compounds are long chain molecules of the following structure:

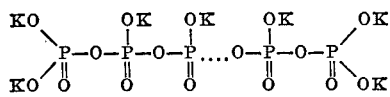

PMP are difficultly soluble in water, solubility thereof being less than 0.004%.

In aqueous sodium salt solution (such as NaCl or $Na_2SO_4$), K in the compound is ion-exchanged by Na to make the compound soluble and, consequently, the solution of high spinnability and viscosity can be obtained.

The inventors have found that, if a sodium salt of an organic high molecular compound such as sodium alginate or CMC-Na is incorporated in place of NaCl or $Na_2SO_4$ in PMP, PMP is made water-soluble by the ion exchange and thus a solution of high spinnability and viscosity is formed.

Figure shows viscosity (centipoise) and spinnability (cm.) of mixture of 1% aqueous sodium alginate solution and 1% PMP suspension in various proportions at 20° C. Viscosity was measured with a capillary viscometer of T.C.I.R.I. (Tokyo Chem. Industrial Research Institute) method system and "spinnability" was represented by length of thread after dipping a glass rod of diameter of 1 cm. in the liquid and then drawing it up at a rate of 30 cm./sec.

The graph shows that the highest viscosity and spinnability are obtained at a PMP:sodium alginate ratio of about 2:8, or 1:4, and that practically preferred range of the ratio is PMP:sodium alginate is 5:5 (or 1:1) to 1:9.

The term "organic high molecular compounds" in the invention suggests alginic acid, carboxymethyl cellulose, carboxymethyl starch, etc. As the "salts thereof," there may be used water-soluble or water-soluble salts thereof with metals of Groups I, II and III in the Periodic Table. For example, sodium, calcium and aluminum salts are preferred. Among them, those containing alginic acid salts are suitable for lubricants, since their flows are most close to Newtonian flow.

Sodium salts of weak acids used in the present invention are, for example, sodium carbonate and sodium phosphates such as sodium pyrophosphate, sodium decaphosphate and sodium polyphosphate.

Proportion of compounds A, B and C in the composition of the present invention is determined naturally according to the following conditions:

(i) Whether compound (B) is water-soluble or water-insoluble salt.
(ii) The final aqueous composition must be adjusted to almost neutral (pH 5–7), since it is to be applied to the parts of living bodies.

In general, preferred proportion is

A:B:C=1:1–2:0.2–2

Particle size of compounds A, B and C in the composition of the present invention is 20–250 mesh, preferably 40–80 mesh.

One of the excellent features of the composition of the present invention is its rapid solubility. In general, water-soluble, highly viscous substances of such a kind form undissolved powder lumps (lumps remaining undissolved when a powder is kneaded with liquid such as water) in the dissolution and a very long time is required for the complete dissolution. Sometimes, complete dissolution cannot be attained even after a whole day and night and thus it is not useful in urgency or it is not helpful to delivery.

The composition of the present invention are free from such disadvantages.

It is considered generally that a cause of the formation of undissolved powder lumps is that a part of water-soluble organic high molecular compound absorbs water and is converted to viscous gel, which covers the undissolved organic high molecular compound to inhibit the subsequent dissolution.

According to the present invention the formation of undissolved powder lumps can be prevented in PMP which is difficultly soluble in water and in compounds B such as alginic acid, CMC, CMS and their Ca or Al salts which are insoluble in water. Thus, not only water-insoluble salts or acids, of compounds B, but water-soluble salts can be used without difficultly in an amount of up to about 30% by weight based on the composition.

The preparation of aqueous compositions to be applied to the parts of living bodies such as human being and other animals is carried out, for example, by the following methods.

(i) A method wherein PMP, insoluble compound B and sodium salt of a weak acid in the form of powders are mixed together and then water is added thereto in a quantity of 30–70 times this amount.
(ii) Sodium salt of a weak acid is added to an aqueous suspension containing PMP and an insoluble compound B.

In any of (i) and (ii), homogeneous composition can be obtained by merely mixing at room temperature. It is preferred, however, to use warm water (40° C.) or to heat the whole if necessary.

Further, various means of dissolutions such as those listed below can be also employed.

(1) Addition of a penetrating agent such as propylene glycol or a surfactant.
(2) Molding into granules.
(3) Coating with a dissolution-retarding substance.
(4) Mixing with glucose, lactose or common salt.

A germicide can be incorporated in the compositions.

The present invention will be described by way of Examples.

EXAMPLE 1

I.

| | G. |
|---|---|
| Potassium polymetaphosphate | 7 |
| Sodium calcium alginate (80% substitution with calcium) | 10 |
| $\alpha$-Amino-p-toluenesulfonamide (germicide) | 1.0 |
| Glucose | 10 |

II.

| | |
|---|---|
| Sodium pyrophosphoric anhydride | 3 |
| Sodium decaphosphate | 2 |
| Glucose | 20 |

The components of I were suspended in 1 liter of water (about 40° C.), then the components of II were added to the suspension and the whole was stirred thoroughly. After about 2 minutes, viscous liquid of a high spinnability was obtained. The product was applied or injected into a parturient canal.

Viscosity of the liquid determined with a capillary viscometer (T.C.I.R.I. method) at 20° C. was 437 centipoises.

EXAMPLE 2

Use in human delivery

Each of powdery mixtures I and II obtained in Example 1 was used in 1/10 amount. 2.8 grams of powdery mixture I were dissolved in 100 ml. of sterile water warmed to 40° C. Then 2.5 g. of powdery mixture II were added thereto and the whole was stirred thoroughly. After about 2 minutes, viscous liquid of a high spinnability was obtained. In the delivery, thus obtained liquid was injected into rectouterine pouch with an injector provided with a polyethylene nozzle and spread throughout the parturient canal with fingers.

In 45 cases, expulsions were facilitated and remarkable effects were recognized in preventing laceration of the perineum and injuries of vaginal wall.

EXAMPLE 3

I.

| | | |
|---|---|---|
| Hydroxypropyl cellulose | g | 0.2 |
| Methanol | cc | 4.0 |
| Propylene glycol | cc | 0.5 |

II.

| | | |
|---|---|---|
| Calcium alginate | g | 10.0 |

III.

| | | |
|---|---|---|
| Potassium polymetaphosphate | g | 7.0 |
| Sodium pyrophosphoric anhydride | g | 4.0 |
| Acid sodium pyrophosphate | g | 2.5 |
| Sodium decaphosphate | g | 2.0 |
| Glucose | g | 23.7 |
| Ethylmercury sodium thiosalicylate (germicide) | g | 0.1 |

Solution I was blended thoroughly with II (i.e. calcium alginate) and the whole was passed through a 40 mesh sieve and dried at 50–60° C. The dry product thus obtained was then mixed with powdery mixture III to obtain homogeneous mixture.

In the practical application, the whole mixture was dissolved in 1 liter of water to obtain solution of a high spinnability after about 2 minutes. Viscosity of the solution determined at 20° C. was 385 centipoises. The solution was warmed to about 40° C. and spread or injected into a parturient canal to obtain very excellent results.

EXAMPLE 4

|  | G. |
|---|---|
| Potassium polymetaphosphate | 6 |
| Sodium pyrophosphate | 2 |
| CMC-Ca | 10 |
| Sodium decaphosphate | 4 |
| Decamethylene bis(4-aminoquinaldinium chloride) | 0.1 |
| Lactose (diluent) | 30 |

The above components were mixed together sufficiently In the practical application, the mixture was dissolved in 1 liter of water to obtain homogeneous, viscous solution of a high spinnability (266 centipoises at 20° C.). The solution warmed to 40° C. was spread or injected into a parturient canal.

EXAMPLE 5

I.

|  | G. |
|---|---|
| Sodium alginate | 10 |
| Sucrose fatty acid ester | 0.3 |

II.

|  | |
|---|---|
| Potassium polymetaphosphate | 0.7 |
| Sodium pyrophosphoric anhydride | 1.0 |
| Sodium decaphosphate | 1.5 |
| Decamethylene bis (4-aminoquinaldinium chloride) | 0.1 |
| Sorbitan fatty acid ester | 0.5 |
| Lactose | 30.0 |

The components I were warmed to 50° C. under thorough stirring to cover sodium alginate with sucrose fatty acid ester coating.

In the practical application, mixture I was added to 1 liter of water at about 40° C. to obtain a suspension, which was then added with mixture II and the whole was stirred thoroughly. After about 2 minutes, viscous solution of a high spinnability was obtained. Viscosity of the solution at 20° C. was 318 centipoises. The solution was spread or injected to a parturient canal.

EXAMPLE 6

|  | G. |
|---|---|
| Potassium polymetaphosphate | 7 |
| Calcium carboxymethyl starch | 10 |
| Sodium pyrophosphate | 4 |
| Acid sodium pyrophosphate | 3 |
| Sodium decaphosphate | 3 |
| Glucose | 20 |
| Ethylmercury sodium thiosalicylate | 0.1 |

The above components were mixed together thoroughly. In the practical application, the mixture was dissolved in 1 liter of water to obtain homogeneous, viscous solution of a high spinnability. Viscosity of the solution at 20° C. was 196 centipoises. In the application, the solution was warmed to 40° C. and applied in the same manner as in the preceding Example.

Toxicity tests have demonstrated that the composition is not irritating to the mucous membranes of the eyelid (mouse, rat and human) and vagina (rat). Congestion or hemorrhage was observed in only one animal each in the case of subcutaneous and intramuscular injection to the mouse and rat. No particular abnormality was observed in the case of abdominal injection to the rat. Collectively, it may be concluded that the solution does not irritate substantially the mucous membranes.

BRIEF DESCRIPTION OF THE DRAWING

Figure shows viscosity (centipoise) and spinnability (cm) of mixtures of 1% aqueous sodium alginate solution and 1% PMP suspension in various proportions at 20° C.

What we claim is:

1. A composition for preparing an aqueous lubricant for parts of living bodies, said composition having a particle size of 20 to 250 mesh and comprising:
   (A) potassium polymetaphosphate,
   (B) at least one member of the group consisting of alginic acid, carboxymethyl cellulose, carboxymethyl starch and salts thereof, and
   (C) at least one sodium salt of a weak acid.
   the proportion of A:B:C being 1:1–2:0.2–2.

2. A process for preparing a lubricant wherein the composition of claim 1 in the form of a powder is added under stirring to a quantity of water 30 to 70 times the quantity of said composition.

3. A composition according to claim 1 wherein component (B) includes at least one sodium or calcium salt of alginic acid, carboxymethyl cellulose or carboxymethyl starch and the sodium salt of the weak acid of component (C) includes at least one carbonate, phosphate, pyrophosphate, decaphosphate or polyphosphate.

4. A lubricant comprising an aqueous solution of a composition as defined in claim 1 in from 30 to 70 parts of water, said lubricant having a pH of from 5 to 7.

5. A process for preparing a lubricant as defined in claim 4 wherein the sodium salt of a weak acid is added to an aqueous suspension of components (A) and (B) and the whole is stirred to homogenity.

References Cited
UNITED STATES PATENTS

| 2,441,729 | 5/1948 | Steiner | 424—361 |
|---|---|---|---|
| 2,635,067 | 4/1953 | Steiner et al. | 424—361 |

SAM ROSEN, Primary Examiner